United States Patent
Kimura et al.

(10) Patent No.: US 9,756,886 B2
(45) Date of Patent: Sep. 12, 2017

(54) ARTIFICIAL HAIR FIBER HAVING SHAPE MEMORY AND SHAPE RESTORATION FUNCTION, ARTIFICIAL HAIR FIBER HAVING EXCELLENT FLAME RESISTANCE, AND ARTIFICIAL HAIR FIBER HAVING LOW GLOSS APPEARANCE

(71) Applicant: Denka Company Limited, Chuo-ku, Tokyo (JP)

(72) Inventors: Tomohiro Kimura, Kamakura (JP); Yudai Ogawa, Kamakura (JP); Yuhei Kasahara, Kamakura (JP); Atsushi Horihata, Kamakura (JP)

(73) Assignee: Denka Company Limited, Chuo-ku, Tokyo (JP)

( * ) Notice: Subject to any disclaimer, the term of this patent is extended or adjusted under 35 U.S.C. 154(b) by 0 days.

(21) Appl. No.: 15/028,394

(22) PCT Filed: Oct. 9, 2014

(86) PCT No.: PCT/JP2014/077093
§ 371 (c)(1),
(2) Date: Apr. 8, 2016

(87) PCT Pub. No.: WO2015/056629
PCT Pub. Date: Apr. 23, 2015

(65) Prior Publication Data
US 2016/0255894 A1    Sep. 8, 2016

(30) Foreign Application Priority Data

Oct. 17, 2013  (JP) ................. 2013-216815
Oct. 17, 2013  (JP) ................. 2013-216819
Oct. 17, 2013  (JP) ................. 2014-216818

(51) Int. Cl.
*A41G 3/00*    (2006.01)
*C08L 77/06*   (2006.01)
*D01F 6/60*    (2006.01)
*D01F 1/10*    (2006.01)
*C08L 77/02*   (2006.01)

(52) U.S. Cl.
CPC .......... *A41G 3/0083* (2013.01); *C08L 77/02* (2013.01); *C08L 77/06* (2013.01); *D01F 1/10* (2013.01); *D01F 6/60* (2013.01)

(58) Field of Classification Search
None
See application file for complete search history.

(56) References Cited

FOREIGN PATENT DOCUMENTS

| JP | 06-287807 A | 10/1994 |
|---|---|---|
| JP | 2002-129432 A | 5/2002 |
| JP | 2004-156149 A | 6/2004 |
| JP | 2004-162195 A | 6/2004 |
| JP | 2007-332507 A | 12/2004 |
| JP | 2011-246843 A | 12/2011 |

OTHER PUBLICATIONS

JP 06-287807 machine translation.*
JP 2011-246843 machine translation.*
JP 2004-162195 a machine translation.*
International Search Report mailed Jan. 6, 2015, issued in corresponding International Application No. PCT/JP2014/077093, filed Oct. 9, 2014, 5 pages.

* cited by examiner

*Primary Examiner* — Ana Woodward
(74) *Attorney, Agent, or Firm* — Christenson O'Connor Johnson Kindness; Andrew Laughlin; Llewellyn Lawson

(57) ABSTRACT

Artificial hair fiber having shape memory and shape restoration function, artificial hair fiber having excellent flame resistance, and artificial hair fiber having low gloss appearance are provided.
Provided is an artificial hair fiber including a resin composition including at least one polyamide, the artificial hair fiber satisfying at least one of constitutions (1) to (3): (1) the fiber has a modulus of elasticity of 2400 to 3000 N/mm$^2$; (2) the polyamide has a weight average molecular weight Mw of $6.5 \times 10^4$ to $15 \times 10^4$ and the fiber has a modulus of elasticity of 500 to 15000 N/mm$^2$; (3) the fiber has a modulus of elasticity of 500 to 15000 N/mm$^2$ and the resin composition contains 5 to 20 parts by mass of fine particles with respect to 100 parts by mass of the polyamide.

17 Claims, No Drawings

ARTIFICIAL HAIR FIBER HAVING SHAPE MEMORY AND SHAPE RESTORATION FUNCTION, ARTIFICIAL HAIR FIBER HAVING EXCELLENT FLAME RESISTANCE, AND ARTIFICIAL HAIR FIBER HAVING LOW GLOSS APPEARANCE

TECHNICAL FIELD

The present invention relates to a fiber used for artificial hair capable of being attached and detached onto head, such as wig, hair-wig, hairpiece and the like, (hereinafter referred to as "artificial hair fiber").

BACKGROUND

As disclosed in Patent Literature 1, vinyl chloride can be mentioned as a material structuring the artificial hair fiber. Vinyl chloride is used in artificial hair fiber due to its superior workability, low cost, and the like.

Regarding artificial hair fiber using vinyl chloride as its material, vinyl chloride resin was inferior in heat resistance against heat from hair iron and the like. When the artificial hair fiber was curled with the hair iron at its common temperature range of 100° C. or higher, fusion, crimp and the like of the fiber occur, resulting in cases where the fiber is damaged or cut.

Accordingly, it was difficult for the user to re-arrange the style arranged by the wig manufacturer into the user's preferable style. Therefore, the user basically had to use the wig with the originally arranged style, and thus there was a limitation in its usage.

In Patent Literature 2, artificial hair fiber prepared by threading a resin composition containing polyamide is disclosed. Polyamide is superior in terms of heat resistance and curl setting characteristics compared with vinyl chloride, and thus problems accompanied with artificial hair fiber made of vinyl chloride can be solved at a certain level.

CITATION LIST

Patent Literature

[Patent Literature 1] JP 2004-156149A
[Patent Literature 2] JP 2011-246843A

SUMMARY OF INVENTION

Technical Problem

Usually, a wig manufacturer obtains fiber from an artificial hair fiber manufacturer, and provides curl and the like to the fibers to have a certain hair-style set. Then, the wig and the like are sold in such conditions. In recent years, users' desire to temporarily alter the hair-style into their taste has been increasing. In addition, desire to recover the altered hair-style into its original shape has been increasing likewise.

Accordingly, also in artificial hair fiber, development of a fiber which can allow the user to alter the original style set by the wig manufacturer into a style of the user's taste, and then recover the style close to the original style set by the wig manufacturer, has been desired.

(First Viewpoint)

The present invention has been made by taking the afore-mentioned circumstances into consideration. The present invention provides an artificial hair fiber having superior shape altering characteristics and shape recovering characteristics.

(Second Viewpoint)

Further, in order to improve safety of the wig, the artificial hair fiber is required to have superior self-extinguishing characteristics and dripping-resistant characteristics.

The second viewpoint of the present invention has been made by taking the afore-mentioned circumstances into consideration. The second viewpoint of the present invention provides an artificial hair fiber having superior shape altering characteristics and shape recovering characteristics as well as superior self-extinguishing characteristics and dripping-resistant characteristics.

(Third Viewpoint)

Further, in order to improve the appearance of the wig, the artificial hair fiber is required to have a glossiness close to that of human hair.

The third viewpoint of the present invention has been made by taking the afore-mentioned circumstances into consideration. The third viewpoint of the present invention provides an artificial hair fiber having superior shape altering characteristics and shape recovering characteristics as well as a glossiness close to that of human hair.

Solution to Problem

According to the present invention, an artificial hair fiber comprising a resin composition including at least one polyamide, the artificial hair fiber satisfying at least one of constitutions (1) to (3), is provided.

(1) The fiber has a modulus of elasticity of 2400 to 3000 N/mm$^2$.
(2) The polyamide has a weight average molecular weight Mw of $6.5 \times 10^4$ to $15 \times 10^4$ and the fiber has a modulus of elasticity of 500 to 15000 N/mm$^2$.
(3) The fiber has a modulus of elasticity of 500 to 15000 N/mm$^2$ and the resin composition contains 5 to 20 parts by mass of fine particles with respect to 100 parts by mass of the polyamide.

(First Viewpoint)

The present inventors have performed extensive research in order to solve the afore-mentioned problems. Accordingly, the present inventors have found that when modulus of elasticity of the artificial hair fiber is in a certain range as in the afore-mentioned constitution (1), the shape altering characteristics and the shape recovering characteristics become especially superior, thereby accomplishing the present invention.

(Second Viewpoint)

The present inventors have performed extensive research in order to solve the afore-mentioned problems. Accordingly, the present inventors have found that when the weight average molecular weight Mw of the polyamide is in a certain range and the modulus of elasticity of the artificial hair fiber is in a certain range as in the afore-mentioned constitution (2), the shape altering characteristics and the shape recovering characteristics become superior as well as the self-extinguishing characteristics and the dripping-resistant characteristics become superior, thereby accomplishing the present invention.

(Third Viewpoint)

The present inventors have performed extensive research in order to solve the afore-mentioned problems. Accordingly, the present inventors have found that when the modulus of elasticity of the artificial hair fiber is in a certain range and the resin composition structuring the fiber contains the fine particles by a certain amount, the shape recovering characteristics become superior as well as the glossiness becomes close to that of human hair, thereby accomplishing the present invention.

Hereinafter, various embodiments of the present invention will be exemplified. The embodiments shown hereinafter can be combined with each other.

Preferably, the constitution (1) is satisfied.
Preferably, the constitution (2) is satisfied.
Preferably, the constitution (3) is satisfied.
Preferably, the constitution (2) or the constitution (3) is satisfied, and the modulus of elasticity is 2400 to 3000 N/mm$^2$.

Preferably, the modulus of elasticity is 2600 to 2800 N/mm$^2$.

Preferably, the resin composition contains an aliphatic polyamide.

Preferably, the aliphatic polyamide contains at least one selected from the group consisting of nylon-6 and nylon-6,6.

Preferably, the polyamide has a weight average molecular weight Mw of $6.5 \times 10^4$ to $15 \times 10^4$.

Preferably, the polyamide has a weight average molecular weight Mw of $7 \times 10^4$ to $12 \times 10^4$.

Preferably, the resin composition comprises organic crosslinked fine particles.

Preferably, the organic crosslinked fine particles are at least one selected from the group consisting of crosslinked nitrile rubber, crosslinked acrylic resin, crosslinked polyester, crosslinked polyamide particles, crosslinked silicone resin, crosslinked polystyrene resin, and crosslinked polyethylene resin.

Preferably, the organic crosslinked fine particles are added by 5 to 20 parts by mass with respect to 100 parts by mass of the polyamide.

Preferably, the organic crosslinked fine particles are added by 6 to 15 parts by mass with respect to 100 parts by mass of the polyamide.

Preferably, the organic crosslinked fine particles contain at least one of crosslinked nitrile rubber and crosslinked silicone resin.

Preferably, the organic crosslinked fine particles contain crosslinked nitrile rubber.

Preferably, the fiber has a fineness of 10 to 150 dtex.

DESCRIPTION OF EMBODIMENTS

Hereinafter, the embodiments of the present invention will be explained. Various features mentioned in the following embodiments can be combined with each other. In addition, an invention can be established independently for each of the features.

The artificial hair fiber according to one embodiment of the first viewpoint of the present invention comprises a resin composition including at least one polyamide, the fiber having a modulus of elasticity of 2400 to 3000 N/mm$^2$.

This artificial hair fiber includes polyamide, and its modulus of elasticity is 2400 to 3000 N/mm$^2$. As shown in the following experimental examples, it became apparent that when the artificial hair fiber including polyamide has such modulus of elasticity, the shape altering characteristics and shape recovering characteristics become especially superior. In addition, the modulus of elasticity is preferably 2600 to 2800 N/mm$^2$ and further preferably 2650 to 2750 N/mm$^2$. When the modulus of elasticity is in such range, the shape altering characteristics and shape recovering characteristics become further superior.

The artificial hair fiber according to one embodiment of the second viewpoint of the present invention comprises a resin composition including at least one polyamide, the polyamide having a weight average molecular weight Mw of $6.5 \times 10^4$ to $15 \times 10^4$ and the fiber having a modulus of elasticity of 500 to 15000 N/mm$^2$.

This artificial hair fiber includes polyamide, and its modulus of elasticity is 500 to 15000 N/mm$^2$. As shown in the following experimental examples, it became apparent that when the artificial hair fiber including polyamide has such modulus of elasticity, the shape altering characteristics and shape recovering characteristics become especially superior. In addition, the modulus of elasticity is preferably 2400 to 3000 N/mm$^2$, further preferably 2600 to 2800 N/mm$^2$ and further more preferably 2650 to 2750 N/mm$^2$. When the modulus of elasticity is in such range, the shape altering characteristics and shape recovering characteristics become further superior.

The artificial hair fiber according to one embodiment of the third viewpoint of the present invention comprises a resin composition including at least one polyamide, the fiber having a modulus of elasticity of 500 to 15000 N/mm$^2$, and the resin composition containing 5 to 20 parts by mass of fine particles with respect to 100 parts by mass of the polyamide.

This artificial hair fiber includes polyamide, and its modulus of elasticity is 500 to 15000 N/mm$^2$. As shown in the following experimental examples, it became apparent that when the artificial hair fiber including polyamide has such modulus of elasticity, the shape altering characteristics and shape recovering characteristics become especially superior. In addition, the modulus of elasticity is preferably 2400 to 3000 N/mm$^2$, further preferably 2600 to 2800 N/mm$^2$ and further more preferably 2650 to 2750 N/mm$^2$. When the modulus of elasticity is in such range, the shape altering characteristics and shape recovering characteristics become further superior.

Hereinafter, the resin composition structuring the artificial hair fiber will be explained in detail.

<Polyamide>

The resin composition used in the present embodiment contains at least one polyamide. The resin composition preferably contains only the polyamide as the resin, however, the resin composition can also contain another resin such as polyester in a range not inhibiting the effect of the present invention. In such case, the content of the polyamide with respect to the entire resin is preferably 80 mass % or more, 90 mass % or more, 95 mass % or more, or 99 mass % or more.

There is no particular limitation regarding the polyamide. Here, the polyamide is at least one selected from the group consisting of aliphatic polyamide and semi-aromatic polyamide. The polyamide is preferably the aliphatic polyamide in terms of shape altering characteristics and shape recovering characteristics.

The aliphatic polyamide is at least one selected from nylon-6, nylon-6,6, nylon-4,6, nylon-12, nylon-6,10, nylon-6,12, nylon-10,10, and nylon-10,12. The aliphatic polyamide is preferably at least one selected from nylon-6 and nylon-6,6, and is more preferably nylon-6,6. When nylon-6 or nylon-6,6 is used, heat resistance required with respect to the temperature of the hair iron used for altering the style again into the user's taste can be obtained.

In addition, as the semi-aromatic polyamide, poly(methaxylene adipamide) (hereinafter abbreviated as MXD6); and substances comprising diamine component derived from aliphatic alkylene diamine and dicarboxylic acid component including aromatic dicarboxylic acid such as terephthalic acid and the like such as PA6T, PA9T, PA10T and the like can be mentioned for example.

The weight average molecular weight (Mw) of the polyamide is $1 \times 10^4$ to $20 \times 10^4$ for example, and is preferably $6.5 \times 10^4$ to $15 \times 10^4$.

When Mw is $6.5 \times 10^4$ or more, the dripping-resistant characteristics become especially superior. On the other hand, when Mw exceeds $15 \times 10^4$, the melt viscosity of the material increases, thereby decreasing the workability when the material is formed into fiber. Accordingly, Mw is preferably $15 \times 10^4$ or lower. When the balance between the dripping-resistant characteristics and workability is taken into consideration, Mw is more preferably $7 \times 10^4$ to $12 \times 10^4$.

<Fine Particles>

The resin composition used in the present embodiment preferably contains fine particles, and further preferably contains fine particles by 5 to 20 parts by mass with respect to 100 parts by mass of the polyamide. By adding the fine particles by a specified amount, low glossiness resembling human hair can be provided to the artificial hair fiber in addition to the shape altering characteristics and the shape recovering characteristics. There is no particular limitation regarding the type of the fine particles. Here, the fine particles are inorganic and/or organic crosslinked fine particles, and are preferably organic crosslinked fine particles in terms of glossiness reducing effect.

There is no particular limitation regarding the organic crosslinked fine particles. Here, the organic crosslinked fine particles are preferably the one which is at least partially incompatible with the polyamide. The organic crosslinked fine particles are preferably at least one selected from crosslinked nitrile rubber, crosslinked acrylic resin, crosslinked polyester, crosslinked polyamide, crosslinked silicone resin, crosslinked polystyrene resin, and crosslinked polyethylene; more preferably at least either one of crosslinked nitrile rubber or crosslinked silicone resin; and further more preferably crosslinked nitrile rubber. According to the experiments performed by the inventors, when organic or inorganic fine particles and the like were added to the resin composition in order to lower the glossiness of the fiber, the fiber tended to whiten after the fiber is drawn. Therefore, when the resin composition is colored with a certain color, there may be a case where the amount of the colorant added is unavoidably increased. However, when the organic crosslinked fine particles comprising crosslinked nitrile rubber or crosslinked silicone resin are added, such whitening can be suppressed. Suppression of whitening is especially remarkable when the organic crosslinked fine particles comprising crosslinked nitrile rubber is added.

The amount of the organic crosslinked fine particles added is, for example, 5 to 20 parts by mass with respect to 100 parts by mass of the polyamide, preferably 6 to 15 parts by mass, and further preferably 8 to 12 parts by mass. When the organic crosslinked fine particles are added by approximately 10 parts by mass with respect to 100 parts by mass of the polyamide, the effect of suppressing glossiness by the organic crosslinked fine particles and other characteristics can be especially highly balanced.

The average particle diameter of the organic crosslinked fine particles is preferably 0.05 to 15 μm, more preferably 0.05 to 10 μm, and further more preferably 0.05 to 5 μm. When the average particle diameter is in such range, the effect of adjusting the glossiness and luster can be made sufficiently large, and the decrease in the fiber strength by the addition of fine particles is hardly observed. Here, in the present specification, "average particle diameter" means a particle diameter at 50% integrated value in the particle size distribution obtained by laser diffraction scattering method.

<Flame Retardant>

Flame retardant can be added to the resin composition used in the present embodiment. When the amount of the flame retardant is too small, the flame retardant effect cannot be exhibited, and when the amount of the flame retardant is too large, the tactile sense after fabrication becomes degraded. Accordingly, the amount of the flame retardant is preferably 3 to 30 parts by mass with respect to 100 parts by mass of the polyamide, and more preferably 10 to 20 parts by mass.

As the flame retardant, bromine compound, halogen compound, phosphorus-halogen compound, nitrogen compound, metal hydroxide.phosphorus-nitrogen compound can be mentioned. Among these, it is preferable to use bromine compound as the bromine-based flame retardant and either one of or both of the phosphorus containing compound as the phosphorus-based flame retardant, and nitrogen compound as the nitrogen-based flame retardant.

<Other Additives>

Regarding the resin composition used in the present embodiment, additives such as flame retardant promoter, heat resistance improver, light stabilizer, fluorescent agent, antioxidant, antistatic agent, pigment, dye, plasticizer, lubricant and the like can be added as necessary in addition to the polyamide resin. By adding colorants such as pigment and dye, a pre-colored fiber (so called spun-dyed fiber) can be obtained.

<Manufacturing Process>

Hereinafter, one example of the manufacturing process of the artificial hair fiber will be explained, however, the present invention shall not be limited to such.

First, the afore-mentioned polyamide and organic crosslinked fine particles added as necessary are melt and kneaded. As the apparatus for melting and kneading, various general kneading machine can be used. As the kneading machine, a single screw extruder, a twin screw extruder, a roller, a Banbury mixer, a kneader and the like can be mentioned. Among these, the twin screw extruder is preferable in terms of adjusting the degree of kneading and simple operation. The artificial hair fiber can be manufactured by selecting an appropriate temperature conditions depending on the polyamide, and performing melt spinning by ordinary melt spinning method.

When nylon-6,6 is used as the polyamide, the temperature of the melt spinning machine such as extruder, spinnret, and gear pump as necessary are set to 270 to 310° C. Subsequently, melt spinning is performed, followed by cooling in a water tank containing water for cooling. Here, the fineness is controlled as well as adjusting the taking-up speed, thereby obtaining undrawn fiber. Here, spinning can be performed by cooling with cold wind, instead of cooling using water tank. Temperature of the cooling water tank, temperature of the cold wind, cooling period, and taking-up speed can be adjusted arbitrarily by the discharging amount and the number of holes in the spinnret.

When melt spinning is performed, a spinning nozzle in which the hole of the nozzle is specially shaped is used. Here, the shape of the cross-section of the artificial hair fiber can be varied as cocoon-shaped, Y-shaped, H-shaped, X-shaped, flower pedal-shaped, and the like.

The undrawn fiber thus obtained undergoes a drawing treatment in order to improve tensile strength of the fiber. The drawing treatment can be performed by a two-process method in which the undrawn fiber is first wound onto a bobbin followed by drawing in a separate process than the melt spinning process, or by a direct spinning-drawing method in which drawing is performed continuously from the melt spinning process without winding the undrawn fiber onto the bobbin. In addition, the drawing treatment is performed by a single-stage drawing method in which the fiber is drawn to a desired drawing magnification by one drawing, or by a multi-stage drawing method in which the fiber is drawn to a desired drawing magnification by two or more times of drawing. When heat drawing treatment is performed, a heating roller, a heat plate, a steam jet apparatus, a warm water tank and the like can be used as the heating measure, and can be arbitrarily used in combination.

The fineness of the artificial hair fiber according to the present embodiment is preferably 10 to 150 dtex, more preferably 30 to 150 dtex, and further more preferably 35 to 120 dtex.

EXAMPLE (First Viewpoint)

Next, an Example of the artificial hair fiber according to the first viewpoint of the present invention will be described in detail by comparing with the Comparative Examples using the Tables.

Polyamide dried so that its coefficient of moisture absorption is lower than 1000 ppm and fine particles were blended so as to have the formulation ratio as shown in Examples and Comparative Examples of Tables 1-1 to 1-4. The numeric values of the formulation amount regarding the polyamide and fine particles in Tables 1-1 to 1-4 are shown by parts by mass. The material blended was kneaded at a barrel temperature set to 275° C. using a ϕ30 mm twin screw extruder, thereby obtaining a raw pellet for spinning.

Subsequently, the pellet was dehumidified and dried so that the water absorption is 1000 ppm or lower, followed by spinning at a barrel temperature set to 285° C. using a ϕ40 mm uniaxial melt spinning machine. The molten resin was ejected from a die having hole diameter of 0.5 mm/hole, cooled by allowing the resin to pass through a water tank at approximately 30° C. while adjusting the ejecting amount and take-up speed, thereby preparing the undrawn fiber having prescribed fineness.

The undrawn fiber thus obtained was drawn at 40° C., and was then subjected to annealing at 150 to 200° C., thereby obtaining the artificial hair fiber having predetermined fineness. The drawing magnification and the relaxing rate during annealing were as shown in Tables 1-1 to 1-4. The relaxing rate during annealing is a value calculated by (rotation speed of take-up roller during annealing)/(rotation speed of feeding roller during annealing).

Modulus of elasticity and weight average molecular weight Mw of the artificial hair fiber thus obtained were measured by the methods described hereinafter. The shape deformation/recovery characteristics, glossiness, self-extinguishing characteristics, dripping-resistant characteristics, and draw-whitening characteristics were evaluated by the evaluation method and criteria described hereinafter. The results are shown in Tables 1-1 to 1-4.

TABLE 1-1

| | | weight average molecular weight Mw | Examples | | | | | |
|---|---|---|---|---|---|---|---|---|
| | | | 1-1 | 1-2 | 1-3 | 1-4 | 1-5 | 1-6 |
| polyamide | nylon-6,6 | 90000 | 100 | 100 | 100 | 100 | 100 | 100 |
| | nylon-6,6 | 70000 | | | | | | |
| fine particles | crosslinked nitrile rubber | | | | | 4 | 5 | 10 |
| | crosslinked silicone resin | | | | | | | |
| | crosslinked acrylic resin | | | | | | | |
| | drawing magnification | | 2.8 | 3.1 | 3.3 | 3.2 | 3.2 | 3.2 |
| | relaxing rate during annealing (%) | | 0 | 0 | 0.1 | 0 | 0 | 0 |
| | modulus of elasticity (N/mm$^2$) | | 2400 | 2700 | 3000 | 2700 | 2700 | 2700 |
| evaluation | shape deformation/recovery characteristics | | B | A | B | A | A | A |
| | glossiness | | C | C | C | C | B | A |
| | self-extinguishing characteristics | | A | A | A | A | A | A |
| | dripping-resistant characteristics | | A | A | A | A | A | A |
| | draw-whitening characteristics | | A | A | A | A | A | A |

| | | weight average molecular weight Mw | Examples | | | | | |
|---|---|---|---|---|---|---|---|---|
| | | | 1-7 | 1-8 | 1-9 | 1-10 | 1-11 | 1-12 |
| polyamide | nylon-6,6 | 90000 | 100 | 100 | 100 | 100 | | |
| | nylon-6,6 | 70000 | | | | | 100 | 100 |
| fine particles | crosslinked nitrile rubber | | 20 | 25 | | | | |
| | crosslinked silicone resin | | | | 10 | | | |
| | crosslinked acrylic resin | | | | | 10 | | |
| | drawing magnification | | 3.3 | 3.3 | 3.2 | 3.2 | 2.8 | 3.1 |
| | relaxing rate during annealing (%) | | 0.1 | 0 | 0 | 0 | 0 | 0 |
| | modulus of elasticity (N/mm$^2$) | | 2700 | 2700 | 2700 | 2700 | 2400 | 2700 |
| evaluation | shape deformation/recovery characteristics | | A | A | A | A | B | A |
| | glossiness | | A | A | A | A | C | C |
| | self-extinguishing characteristics | | A | A | A | A | A | A |
| | dripping-resistant characteristics | | A | A | A | A | A | A |
| | draw-whitening characteristics | | B | C | B | C | A | A |

TABLE 1-2

| | | weight average molecular weight Mw | Examples 1-13 | 1-14 | 1-15 | 1-16 | 1-17 | 1-18 |
|---|---|---|---|---|---|---|---|---|
| polyamide | nylon-6,6 | 70000 | 100 | 100 | 100 | 100 | | |
| | nylon-6,6 | 50000 | | | | | 100 | 100 |
| | nylon-6 | 90000 | | | | | | |
| fine particles | crosslinked nitrile rubber | | | 10 | | | | |
| | crosslinked silicone resin | | | | 10 | | | |
| | crosslinked acrylic resin | | | | | 10 | | |
| | drawing magnification | | 3.3 | 3.2 | 3.2 | 3.2 | 2.8 | 3.1 |
| | relaxing rate during annealing (%) | | 0.1 | 0 | 0 | 0 | 0 | 0 |
| | modulus of elasticity (N/mm$^2$) | | 3000 | 2700 | 2700 | 2700 | 2400 | 2700 |
| evaluation | shape deformation/recovery characteristics | | B | A | A | A | B | A |
| | glossiness | | C | A | A | A | C | C |
| | self-extinguishing characteristics | | A | A | A | A | A | A |
| | dripping-resistant characteristics | | A | A | A | A | D | D |
| | draw-whitening characteristics | | A | A | B | C | A | A |

| | | weight average molecular weight Mw | Examples 1-19 | 1-20 | 1-21 | 1-22 | 1-23 | 1-24 |
|---|---|---|---|---|---|---|---|---|
| polyamide | nylon-6,6 | 70000 | | | | | | |
| | nylon-6,6 | 50000 | 100 | 100 | 100 | 100 | | |
| | nylon-6 | 90000 | | | | | 100 | 100 |
| fine particles | crosslinked nitrile rubber | | | 10 | | | | |
| | crosslinked silicone resin | | | | 10 | | | |
| | crosslinked acrylic resin | | | | | 10 | | |
| | drawing magnification | | 3.3 | 3.2 | 3.2 | 3.2 | 2.8 | 3.1 |
| | relaxing rate during annealing (%) | | 0.1 | 0 | 0 | 0 | 0 | 0 |
| | modulus of elasticity (N/mm$^2$) | | 3000 | 2700 | 2700 | 2700 | 2400 | 2700 |
| evaluation | shape deformation/recovery characteristics | | B | A | A | A | B | A |
| | glossiness | | C | A | A | A | C | C |
| | self-extinguishing characteristics | | A | A | A | A | A | A |
| | dripping-resistant characteristics | | D | D | D | D | A | A |
| | draw-whitening characteristics | | A | A | B | C | A | A |

TABLE 1-3

| | | weight average molecular weight Mw | Examples 1-25 | 1-26 | 1-27 | 1-28 | 1-29 | 1-30 | 1-31 | 1-32 | 1-33 | 1-34 |
|---|---|---|---|---|---|---|---|---|---|---|---|---|
| polyamide | nylon-6 | 90000 | 100 | 100 | 100 | 100 | | | | | | |
| | semi-aromatic polyamide | 90000 | | | | | 100 | 100 | 100 | 100 | 100 | 100 |
| fine particles | crosslinked nitrile rubber | | | 10 | | | | | | 10 | | |
| | crosslinked silicone resin | | | | 10 | | | | | | 10 | |
| | crosslinked acrylic resin | | | | | 10 | | | | | | 10 |
| | drawing magnification | | 3.3 | 3.2 | 3.2 | 3.2 | 2.8 | 3.1 | 3.3 | 3.2 | 3.2 | 3.2 |
| | relaxing rate during annealing (%) | | 0.1 | 0 | 0 | 0 | 0 | 0 | 0.1 | 0 | 0 | 0 |
| | modulus of elasticity (N/mm$^2$) | | 3000 | 2700 | 2700 | 2700 | 2400 | 2700 | 3000 | 2700 | 2700 | 2700 |
| evaluation | shape deformation/recovery characteristics | | B | A | A | A | C | B | C | B | B | B |
| | glossiness | | C | A | A | A | C | C | C | A | A | A |
| | self-extinguishing characteristics | | A | A | A | A | A | A | A | A | A | A |
| | dripping-resistant characteristics | | A | A | A | A | A | A | A | A | A | A |
| | draw-whitening characteristics | | A | A | B | C | A | A | A | A | B | C |

TABLE 1-4

| | | weight average molecular weight Mw | Comparative Examples 1-1 | 1-2 | 1-3 | 1-4 | 1-5 | 1-6 | 1-7 | 1-8 | 1-9 | 1-10 |
|---|---|---|---|---|---|---|---|---|---|---|---|---|
| polyamide | nylon-6,6 | 90000 | 100 | 100 | | | | | | | | |
| | nylon-6,6 | 70000 | | | 100 | 100 | | | | | | |
| | nylon-6,6 | 50000 | | | | | 100 | 100 | | | | |
| | nylon-6 | 90000 | | | | | | | 100 | 100 | | |
| | semi-aromatic polyamide | 90000 | | | | | | | | | 100 | 100 |

TABLE 1-4-continued

| weight average molecular weight Mw | | Comparative Examples | | | | | | | | | |
|---|---|---|---|---|---|---|---|---|---|---|---|
| | | 1-1 | 1-2 | 1-3 | 1-4 | 1-5 | 1-6 | 1-7 | 1-8 | 1-9 | 1-10 |
| | drawing magnification | 2.8 | 3.3 | 2.8 | 3.3 | 2.8 | 3.3 | 2.8 | 3.3 | 2.8 | 3.3 |
| | relaxing rate during annealing (%) | 0.1 | 0 | 0.1 | 0 | 0.1 | 0 | 0.1 | 0 | 0.1 | 0 |
| | modulus of elasticity (N/mm$^2$) | 2350 | 3050 | 2350 | 3050 | 2350 | 3050 | 2350 | 3050 | 2350 | 3050 |
| evaluation | shape deformation/recovery characteristics | C | C | C | C | C | C | C | C | D | D |
| | glossiness | C | C | C | C | C | C | C | C | C | C |
| | self-extinguishing characteristics | A | A | A | A | A | A | A | A | A | A |
| | dripping-resistant characteristics | A | A | A | A | D | D | A | A | A | A |
| | draw-whitening characteristics | A | A | A | A | A | A | A | A | A | A |

The following materials were used as the raw materials mentioned in Tables 1-1 to 1-4.

Nylon-6,6 (Mw: 50000): Aramin CM 3001-N, available from Toray Industries, Inc.

Nylon-6,6 (Mw: 70000): Leona 1500, available from Asahi Kasei Chemicals Corporation Nylon-6,6 (Mw: 90000): Zytel 42A, available from Du Pont Kabushiki Kaisha Nylon-6 (Mw: 90000): prepared by Denka Company Limited Semi-aromatic polyamide (Nylon 6T) (Mw: 90000): prepared by Denka Company Limited Crosslinked nitrile rubber: Napo VP-402, available from China Petrochemical Corporation Crosslinked silicone resin: EP 5500, available from Dow Corning Toray Co., Ltd.

Crosslinked acrylic resin: KMR3TA, available from Soken Chemical & Engineering Co., Ltd.

The modulus of elasticity and weight average molecular weight Mw mentioned in Tables 1-1 to 1-4 were measured in accordance with the following methods.

<Modulus of Elasticity>

Autograph "AGS-X" available from Shimadzu Corporation was used, and measurement was performed with the conditions of chuck-chuck distance of 200 mm and tension speed of 200 ram/min, thereby obtaining the information on modulus of elasticity. The samples for measurement were randomly selected from the bundles of each of the Examples and Comparative Examples, by the number of 10. Tensile strength was measured for each one of the fibers, and the modulus of elasticity was calculated. The average of the measured values for 10 fibers was taken as the modulus of elasticity for the fiber prepared by such conditions.

<Weight Average Molecular Weight Mw>

Weight average molecular weight Mw was obtained by the measurement performed with the following facility and conditions.

Apparatus used: pump—shodexDS-4
    column—shodex GPC HFIP-806Mx2+HFIP-803
    detector—shodex RI-71
    Eluent: hexafluoro isopropanol (+additive $CF_3COONa$ (5 mmol/L))
    Pre-treatment: filtration using membrane filter (0.2 µm)
    Concentration: 0.2 w/v %
    Injection volume: 100 µL
    Column temperature: 40° C.
    Flow rate: 1.0 ml/min
    Standard substance: standard polymethyl methacrylate (PMMA)

Calibration curve was prepared using the standard PMMA, and the weight average molecular weight was shown as PMMA conversion value.

The evaluation method and criteria for each of the evaluation items mentioned in Tables 1-1 to 1-4 are as follows.

<Shape Deformation/Recovery Characteristics>

The artificial hair fiber in each of the Examples and Comparative Examples were cut into a length of 30 cm, thereby preparing a fiber bundle sample having a weight of 2 g containing a number of fibers. The fiber bundle was wound onto a pipe of ϕ18 mm, subjected to steam heating for 60 minutes under 110° C. saturated steam pressure, thereby providing initial curl.

The fiber bundle was allowed to stand for 24 hours at room temperature and dried. The fiber bundle was taken off from the pipe and hung. The length after 24 hours was taken as the length (L1).

Subsequently, water was sprayed onto the fiber bundle with the curl using an atomizer, so that the fiber bundle becomes entirely wet. The fiber bundle was stretched using a brush, and was blown using a drier. Hot wind from the drier was applied while stretching the fiber bundle with the brush. This procedure was repeated for 10 times, and the fiber bundle was fully blown and dried. The length when the fiber bundle was hung was taken as the length (L2). Le was defined by L2/L1=Le, and was taken as the deformation rate, used as an index of deformation tendency of the fiber bundle.

Then, the deformed fiber bundle was immersed in hot water at 50° C. for 30 seconds, and was then taken out from the hot water. Moisture was thoroughly wiped off with paper, followed by application of warm wind for 30 seconds using a drier, thereby fully drying the moisture on the surface of the fiber bundle. The length when the fiber bundle was hung was taken as the length (L3). Lr was defined by L3/L1=Lr, and was taken as the recovery coefficient, used as an index of recovery ability of the fiber bundle.

The afore-mentioned index of deformation characteristics and recovery characteristics were used to perform the following evaluation.

(Deformation/Recovery Characteristics)
A: Le≥1.5 and Lr≤1.2
B: Le≥1.5 and 1.2<Lr≤1.3
C: 1.5>Le≥1.3 and Lr≤1.2
D: 1.5>Le≥1.3 and 1.2<Lr≤1.3
E: none of the above criteria A-D satisfied <Glossiness>

Evaluation of glossiness was conducted by visual observation.

A bundle of the artificial hair fiber was prepared with 3000 fibers with a length of 20 cm, observation was performed under sunlight, and evaluation was made in accordance with the following evaluation criteria.

A: glossiness similar with human hair
B: glossiness similar with human hair in general, difference observed when compared closely
C: notable difference in glossiness compared with human hair observed at a glance <Flammability (Self-Extinguishing Characteristics, Dripping-Resistant Characteristics)>

Evaluation of flammability was performed as the "self-extinguishing characteristics" and "dripping-resistant characteristics". In both of the evaluation, artificial hair fiber were cut into a length of 30 cm, thereby preparing a fiber bundle sample having a weight of 2 g containing a number of fibers. One end of the fiber bundle was fixed to allow the fiber bundle to hang vertically, and the lower end was allowed to contact with a flame having a length of 20 mm for 5 seconds. The fire propagation period after taking away the flame, and the times of dripping during such period were each measured. Evaluation was performed with the following criteria. The results are shown as the average of three measurement results.

(Self-Extinguishing Characteristics)
A: fire propagation period is 1 second or less
B: fire propagation period is 2 seconds or more and less than 5 seconds
C: fire propagation period is 6 seconds or more and less than 10 seconds
D: fire propagation period is 10 seconds or more (Dripping-Resistant Characteristics)
A: dripping occurred 0 time
B: dripping occurred 1 or more times and less than 2 times
C: dripping occurred 3 or more times and less than 5 times
D: dripping occurred 6 or more times <Draw-Whitening Characteristics>

When the undrawn fiber was prepared, black colorant was added to allow easy observation of the whitening conditions after drawing. The undrawn fiber bundle and the fiber bundle after drawing was compared by visual observation, and the degree of whitening of the drawn fiber compared with the undrawn fiber was evaluated in accordance with the criteria below.

A: almost no whitening observed when undrawn fiber bundle and drawn fiber bundle were compared
B: whitening observed when undrawn fiber bundle and drawn fiber bundle were compared closely, however not at a bothersome degree
C: notable whitening when undrawn fiber bundle and drawn fiber bundle were compared <Discussion>

As shown in the afore-mentioned Examples and Comparative Examples, it became apparent that artificial hair fiber having superior shape deformation/recovery characteristics can be obtained by allowing the modulus of elasticity of the fiber to be in the range of 2400 to 3000 N/mm$^2$. In addition, it became apparent that shape deformation/recovery characteristics can be further improved by allowing the modulus of elasticity of the fiber to be in the range of 2600 to 2700 N/mm$^2$.

Further, it became apparent that shape deformation/recovery characteristics is especially superior when aliphatic polyamide (nylon-6 and nylon-6,6) was used as the polyamide.

In addition, it became apparent that dripping-resistant characteristics can be improved by allowing the weight average molecular weight Mw of the polyamide to be in the range of $6.5 \times 10^4$ to $15 \times 10^4$.

Further, it became apparent that the glossiness can be made close to that of human hair by adding appropriate amount of the fine particles. In addition, it became apparent that whitening during drawing can be suppressed by using fine particles made from crosslinked nitrile rubber.

(Second Viewpoint)

Next, the Examples of the artificial hair fiber in accordance with the second viewpoint of the present invention will be explained in detail by comparing with the Comparative Examples using the Tables.

Artificial hair fiber was prepared in a similar manner as in the Examples and Comparative Examples of the first viewpoint. Evaluation was also performed in a similar manner. The results are shown in Tables 2-1 to 2-5. The raw material, measuring method of modulus of elasticity and weight average molecular weight Mw, and evaluation method and criteria for each of the evaluation items are the same as the first viewpoint.

TABLE 2-1

| | | weight average molecular weight Mw | Examples | | | | | | | | | | |
|---|---|---|---|---|---|---|---|---|---|---|---|---|---|
| | | | 2-1 | 2-2 | 2-3 | 2-4 | 2-5 | 2-6 | 2-7 | 2-8 | 2-9 | 2-10 | 2-11 |
| polyamide | nylon-6,6 | 90000 | 100 | 100 | 100 | 100 | 100 | 100 | 100 | 100 | 100 | 100 | 100 |
| fine particles | crosslinked nitrile rubber | | | | | | | | | | | 4 | 5 |
| | drawing magnification | | 1.03 | 2 | 2.8 | 2.8 | 3.1 | 3.3 | 3.3 | 5 | 7.2 | 3.2 | 3.2 |
| | relaxing rate during annealing (%) | | 0 | 0 | 0.1 | 0 | 0 | 0.1 | 0 | 0 | 0.1 | 0 | 0 |
| | modulus of elasticity (N/mm$^2$) | | 500 | 1500 | 2350 | 2400 | 2700 | 3000 | 3050 | 7000 | 15000 | 2700 | 2700 |
| evaluation | shape deformation/recovery characteristics | | C | C | C | B | A | B | C | C | C | A | A |
| | glossiness | | C | C | C | C | C | C | C | C | C | C | B |
| | self-extinguishing characteristics | | A | A | A | A | A | A | A | A | A | A | A |
| | dripping-resistant characteristics | | A | A | A | A | A | A | A | A | A | A | A |
| | draw-whitening characteristics | | A | A | A | A | A | A | A | A | A | A | A |

TABLE 2-2

| | | weight average molecular weight Mw | Examples | | | | | | | | | | |
|---|---|---|---|---|---|---|---|---|---|---|---|---|---|
| | | | 2-12 | 2-13 | 2-14 | 2-15 | 2-16 | 2-17 | 2-18 | 2-19 | 2-20 | 2-21 | 2-22 |
| polyamide | nylon-6,6 | 90000 | 100 | 100 | 100 | 100 | 100 | | | | | | |
| | nylon-6,6 | 70000 | | | | | | 100 | 100 | 100 | 100 | 100 | 100 |
| fine particles | crosslinked nitrile rubber | | 10 | 20 | 25 | | | | | | | | 10 |
| | crosslinked silicone resin | | | | | 10 | | | | | | | |
| | crosslinked acrylic resin | | | | | | 10 | | | | | | |
| | drawing magnification | | 3.2 | 3.3 | 3.3 | 3.2 | 3.2 | 1.03 | 2.8 | 3.1 | 3.3 | 7.2 | 3.2 |
| | relaxing rate during annealing (%) | | 0 | 0.1 | 0 | 0 | 0 | 0 | 0 | 0 | 0.1 | 0.1 | 0 |
| | modulus of elasticity (N/mm$^2$) | | 2700 | 2700 | 2700 | 2700 | 2700 | 500 | 2400 | 2700 | 3000 | 15000 | 2700 |
| evaluation | shape deformation/recovery characteristics | | A | A | A | A | A | C | B | A | B | C | A |
| | glossiness | | A | A | A | A | A | C | C | C | C | C | A |
| | self-extinguishing characteristics | | A | A | A | A | A | A | A | A | A | A | A |
| | dripping-resistant characteristics | | A | A | A | A | A | A | A | A | A | A | A |
| | draw-whitening characteristics | | A | B | C | B | C | A | A | A | A | A | A |

TABLE 2-3

| | | weight average molecular weight Mw | Examples | | | | | | | | | | |
|---|---|---|---|---|---|---|---|---|---|---|---|---|---|
| | | | 2-23 | 2-24 | 2-25 | 2-26 | 2-27 | 2-28 | 2-29 | 2-30 | 2-31 | 2-32 | 2-33 |
| polyamide | nylon-6,6 | 70000 | 100 | 100 | | | | | | | | | |
| | nylon-6 | 90000 | | | 100 | 100 | 100 | 100 | 100 | 100 | 100 | 100 | |
| | semi-aromatic pulyamide | 90000 | | | | | | | | | | | 100 |
| fine particles | crosslinked nitrile rubber | | | | | | | | | | 10 | | |
| | crosslinked silicone resin | | 10 | | | | | | | | | 10 | |
| | crosslinked acrylic resin | | | 10 | | | | | | | | | 10 |
| | drawing magnification | | 3.2 | 3.2 | 1.03 | 2.8 | 3.1 | 3.3 | 7.2 | 3.2 | 3.2 | 3.2 | 1.03 |
| | relaxing rate during annealing (%) | | 0 | 0 | 0 | 0 | 0 | 0.1 | 0.1 | 0 | 0 | 0 | 0 |
| | modulus of elasticity (N/mm$^2$) | | 2700 | 2700 | 500 | 2400 | 2700 | 3000 | 15000 | 2700 | 2700 | 2700 | 500 |
| evaluation | shape deformation/recovery characteristics | | A | A | C | B | A | B | C | A | A | A | D |
| | glossiness | | A | A | C | C | C | C | A | A | A | A | C |
| | self-extinguishing characteristics | | A | A | A | A | A | A | A | A | A | A | A |
| | dripping-resistant characteristics | | A | A | A | A | A | A | A | A | A | A | A |
| | draw-whitening characteristics | | B | C | A | A | A | A | A | A | B | C | A |

TABLE 2-4

| | | weight average molecular weight Mw | Examples | | | | | | |
|---|---|---|---|---|---|---|---|---|---|
| | | | 2-34 | 2-35 | 2-36 | 2-37 | 2-38 | 2-39 | 2-40 |
| polyamide | semi-aromatic polyamide | 90000 | 100 | 100 | 100 | 100 | 100 | 100 | 100 |
| fine particles | crosslinked nitrile rubber | | | | | | 10 | | |
| | crosslinked silicone resin | | | | | | | 10 | |
| | crosslinked acrylic resin | | | | | | | | 10 |
| | drawing magnification | | 2.8 | 3.1 | 3.3 | 7.2 | 3.2 | 3.2 | 3.2 |
| | relaxing rate during annealing (%) | | 0 | 0 | 0.1 | 0.1 | 0 | 0 | 0 |
| | modulus of elasticity (N/mm$^2$) | | 2400 | 2700 | 3000 | 15000 | 2700 | 2700 | 2700 |
| evaluation | shape deformation/recovery characteristics | | C | B | C | D | B | B | B |
| | glossiness | | C | C | C | C | A | A | A |
| | self-extinguishing characteristics | | A | A | A | A | A | A | A |
| | dripping-resistant characteristics | | A | A | A | A | A | A | A |
| | draw-whitening characteristics | | A | A | A | A | A | B | C |

TABLE 2-5

| | | weight average molecular weight Mw | Comparative Examples | | | | | | | | | | |
|---|---|---|---|---|---|---|---|---|---|---|---|---|---|
| | | | 2-1 | 2-2 | 2-3 | 2-4 | 2-5 | 2-6 | 2-7 | 2-8 | 2-9 | 2-10 | 2-11 |
| polyamide | nylon-6,6 | 90000 | 100 | 100 | | | | | | | | | |
| | nylon-6,6 | 70000 | | | 100 | 100 | | | | | | | |
| | nylon-6,6 | 50000 | | | | | 100 | 100 | 100 | | | | |
| | nylon-6 | 90000 | | | | | | | | 100 | 100 | | |
| | semi-aromatic polyamide | 90000 | | | | | | | | | | 100 | 100 |
| | drawing magnification | | 1.02 | 7.2 | 1.02 | 7.2 | 2.8 | 3.1 | 3.3 | 1.02 | 7.2 | 1.02 | 7.2 |
| | relaxing rate during annealing (%) | | 0 | 0 | 0 | 0 | 0 | 0 | 0.1 | 0 | 0 | 0 | 0 |
| | modulus of elasticity (N/mm$^2$) | | 400 | 16000 | 400 | 16000 | 2400 | 2700 | 3000 | 400 | 16000 | 400 | 16000 |
| evaluation | shape deformation/recovery characteristics | | D | D | D | D | B | A | B | D | D | E | E |
| | glossiness | | C | C | C | C | C | C | C | C | C | C | C |
| | self-extinguishing characteristics | | A | A | A | A | A | A | A | A | A | A | A |
| | dripping-resistant characteristics | | A | A | A | A | D | D | D | A | A | A | A |
| | draw-whitening characteristics | | A | A | A | A | A | A | A | A | A | A | A |

<Discussion>

As shown in the afore-mentioned Examples and Comparative Examples, it became apparent that artificial hair fiber having both of superior shape deformation/recovery characteristics and dripping-resistant characteristics can be obtained by allowing the weight average molecular weight Mw of the polyamide to be in the range of $6.5 \times 10^4$ to $15 \times 10^4$ and the modulus of elasticity of the fiber to be in the range of 500 to 15000 N/mm$^2$. In addition, it became apparent that shape deformation/recovery characteristics can be further improved by allowing the modulus of elasticity of the fiber to be in the range of 2400 to 3000 N/mm$^2$, and that shape deformation/recovery characteristics can be further improved by allowing the modulus of elasticity of the fiber to be in the range of 2600 to 2700 N/mm$^2$.

Further, it became apparent that shape deformation/recovery characteristics is especially superior when aliphatic polyamide (nylon-6 and nylon-6,6) was used as the polyamide.

Further, it became apparent that the glossiness can be made close to that of human hair by adding appropriate amount of the fine particles. In addition, it became apparent that whitening during drawing can be suppressed by using fine particles made from crosslinked nitrile rubber.

(Third Viewpoint)

Next, the Examples of the artificial hair fiber in accordance with the third viewpoint of the present invention will be explained in detail by comparing with the Comparative Examples using the Tables.

Artificial hair fiber was prepared in a similar manner as in the Examples and Comparative Examples of the first viewpoint. Evaluation was also performed in a similar manner. The results are shown in Tables 3-1 to 3-5. The raw material, measuring method of modulus of elasticity of weight average molecular weight Mw, and evaluation method and criteria for each of the evaluation items are the same as the first viewpoint.

TABLE 3-1

| | | weight average molecular weight Mw | Examples | | | | | | |
|---|---|---|---|---|---|---|---|---|---|
| | | | 3-1 | 3-2 | 3-3 | 3-4 | 3-5 | 3-6 | 3-7 |
| polyamide | nylon-6,6 | 90000 | 100 | 100 | 100 | 100 | 100 | 100 | 100 |
| fine particles | crosslinked nitrile rubber | | 10 | 10 | 10 | 10 | 10 | 10 | 10 |
| | crosslinked silicone resin | | | | | | | | |
| | drawing magnification | | 1.13 | 2.1 | 2.9 | 2.9 | 3.2 | 3.4 | 3.4 |
| | relaxing rate during annealing (%) | | 0 | 0 | 0.1 | 0 | 0 | 0.1 | 0 |
| | modulus of elasticity (N/mm$^2$) | | 500 | 1500 | 2350 | 2400 | 2700 | 3000 | 3050 |
| evaluation | shape deformation/recovery characteristics | | C | C | C | B | A | B | C |
| | glossiness | | A | A | A | A | A | A | A |
| | self-extinguishing characteristics | | A | A | A | A | A | A | A |
| | dripping-resistant characteristics | | A | A | A | A | A | A | A |
| | draw-whitening characteristics | | A | A | A | A | A | A | A |

| | | weight average molecular weight Mw | Examples | | | | | | |
|---|---|---|---|---|---|---|---|---|---|
| | | | 3-8 | 3-9 | 3-10 | 3-11 | 3-12 | 3-13 | 3-14 |
| polyamide | nylon-6,6 | 90000 | 100 | 100 | 100 | 100 | 100 | 100 | 100 |
| fine particles | crosslinked nitrile rubber | | 10 | 10 | 5 | 20 | | | |
| | crosslinked silicone resin | | | | | | 10 | 10 | 10 |
| | drawing magnification | | 5.1 | 7.3 | 3.2 | 3.3 | 1.13 | 2.9 | 3.2 |
| | relaxing rate during annealing (%) | | 0 | 0.1 | 0 | 0.1 | 0 | 0 | 0 |
| | modulus of elasticity (N/mm$^2$) | | 7000 | 15000 | 2700 | 2700 | 500 | 2400 | 2700 |
| evaluation | shape deformation/recovery characteristics | | C | C | A | A | C | B | A |
| | glossiness | | A | A | B | A | A | A | A |

TABLE 3-1-continued

|  |  |  |  |  |  |  |  |
|---|---|---|---|---|---|---|---|
| self-extinguishing characteristics | A | A | A | A | A | A | A |
| dripping-resistant characteristics | A | A | A | A | A | A | A |
| draw-whitening characteristics | A | A | A | B | B | B | B |

TABLE 3-2

| | | Weight average molecular weight Mw | Examples | | | | | | |
|---|---|---|---|---|---|---|---|---|---|
| | | | 3-15 | 3-16 | 3-17 | 3-18 | 3-19 | 3-20 | 3-21 |
| polyamide | nylon-6,6 | 90000 | 100 | 100 | 100 | 100 | 100 | 100 | 100 |
| | nylon-6,6 | 70000 | | | | | | | |
| fine particles | crosslinked nitrile rubber | | | | | | | | |
| | crosslinked silicone resin | | 10 | 10 | 5 | 20 | | | |
| | crosslinked acrylic resin | | | | | | 10 | 10 | 10 |
| | drawing magnification | | 3.4 | 7.3 | 3.2 | 3.3 | 1.13 | 2.9 | 3.2 |
| | relaxing rate during annealing (%) | | 0.1 | 0.1 | 0 | 0.1 | 0 | 0 | 0 |
| | modulus of elasticity (N/mm$^2$) | | 3000 | 15000 | 2700 | 2700 | 500 | 2400 | 2700 |
| evaluation | shape deformation/recovery characteristics | | B | C | A | A | C | B | A |
| | glossiness | | A | A | B | A | A | A | A |
| | self-extinguishing characteristics | | A | A | A | A | A | A | A |
| | dripping-resistant characteristics | | A | A | A | A | A | A | A |
| | draw-whitening characteristics | | B | B | A | B | C | C | C |

| | | Weight average molecular weight Mw | Examples | | | | | | |
|---|---|---|---|---|---|---|---|---|---|
| | | | 3-22 | 3-23 | 3-24 | 3-25 | 3-26 | 3-27 | 3-28 |
| polyamide | nylon-6,6 | 90000 | 100 | 100 | 100 | 100 | | | |
| | nylon-6,6 | 70000 | | | | | 100 | 100 | 100 |
| fine particles | crosslinked nitrile rubber | | | | | | | 10 | |
| | crosslinked silicone resin | | | | | | | | 10 |
| | crosslinked acrylic resin | | 10 | 10 | 5 | 20 | | | 10 |
| | drawing magnification | | 3.4 | 7.3 | 3.2 | 3.3 | 3.2 | 3.2 | 3.2 |
| | relaxing rate during annealing (%) | | 0.1 | 0.1 | 0 | 0.1 | 0 | 0 | 0 |
| | modulus of elasticity (N/mm$^2$) | | 3000 | 15000 | 2700 | 2700 | 2700 | 2700 | 2700 |
| evaluation | shape deformation/recovery characteristics | | B | C | A | A | A | A | A |
| | glossiness | | A | A | B | A | A | A | A |
| | self-extinguishing characteristics | | A | A | A | A | A | A | A |
| | dripping-resistant characteristics | | A | A | A | A | A | A | A |
| | draw-whitening characteristics | | C | C | B | C | A | B | C |

TABLE 3-3

| | | weight average molecular weight Mw | Examples | | | | | | | | |
|---|---|---|---|---|---|---|---|---|---|---|---|
| | | | 3-29 | 3-30 | 3-31 | 3-32 | 3-33 | 3-34 | 3-35 | 3-36 | 3-37 |
| polyamide | nylon-6,6 | 50000 | 100 | 100 | 100 | | | | | | |
| | nylon-6 | 90000 | | | | 100 | 100 | 100 | | | |
| | semi-aromatic polyamide | 90000 | | | | | | | 100 | 100 | 100 |
| fine particles | crosslinked nitrile rubber | | 10 | | | 10 | | | 10 | | |
| | crosslinked silicone resin | | | 10 | | | 10 | | | 10 | |
| | crosslinked acrylic resin | | | | 10 | | | 10 | | | 10 |
| | drawing magnification | | 3.2 | 3.2 | 3.2 | 3.2 | 3.2 | 3.2 | 3.2 | 3.2 | 3.2 |
| | relaxing rate during annealing (%) | | 0 | 0 | 0 | 0 | 0 | 0 | 0 | 0 | 0 |
| | modulus of elasticity (N/mm$^2$) | | 2700 | 2700 | 2700 | 2700 | 2700 | 2700 | 2700 | 2700 | 2700 |
| evaluation | shape deformation/recovery characteristics | | A | A | A | A | A | A | B | B | B |
| | glossiness | | A | A | A | A | A | A | A | A | A |
| | self-extinguishing characteristics | | A | A | A | A | A | A | A | A | A |
| | dripping-resistant characteristics | | D | D | D | A | A | A | A | A | A |
| | draw-whitening characteristics | | A | B | C | A | B | C | A | B | C |

TABLE 3-4

| | | weight average molecular weight Mw | Comparative Examples | | | | | | |
|---|---|---|---|---|---|---|---|---|---|
| | | | 3-1 | 3-2 | 3-3 | 3-4 | 3-5 | 3-6 | 3-7 |
| polyamide | nylon-6,6 | 90000 | 100 | 100 | 100 | 100 | 100 | 100 | 100 |
| | nylon-6,6 | 70000 | | | | | | | |
| | nylon-6,6 | 50000 | | | | | | | |
| fine particles | crosslinked nitrile rubber | | 10 | 10 | 4 | 25 | | | |
| | crosslinked silicone resin | | | | | | 4 | 25 | |
| | crosslinked acrylic resin | | | | | | | | 4 |
| | drawing magnification | | 1.12 | 7.3 | 3.2 | 3.3 | 3.2 | 3.3 | 3.2 |
| | relaxing rate during annealing (%) | | 0 | 0 | 0 | 0 | 0 | 0 | 0 |
| | modulus of elasticity (N/mm$^2$) | | 400 | 16000 | 2700 | 2700 | 2700 | 2700 | 2700 |
| evaluation | shape deformation/recovery characteristics | | D | D | A | A | A | A | A |
| | glossiness | | A | A | C | A | C | A | C |
| | self-extinguishing characteristics | | A | A | A | A | A | A | A |
| | dripping-resistant characteristics | | A | A | A | A | A | A | A |
| | draw-whitening characteristics | | A | A | A | C | A | C | B |

| | | weight average molecular weight Mw | Comparative Examples | | | | | | |
|---|---|---|---|---|---|---|---|---|---|
| | | | 3-8 | 3-9 | 3-10 | 3-11 | 3-12 | 3-13 | 3-14 |
| polyamide | nylon-6,6 | 90000 | | | | | | | |
| | nylon-6,6 | 70000 | 100 | 100 | 100 | 100 | 100 | | |
| | nylon-6,6 | 50000 | | | | | | 100 | 100 |
| fine particles | crosslinked nitrile rubber | | 4 | 25 | | | | 4 | 25 |
| | crosslinked silicone resin | | | | 4 | 25 | | | |
| | crosslinked acrylic resin | | | | | | 4 | | |
| | drawing magnification | | 3.2 | 3.3 | 3.2 | 3.3 | 3.2 | 3.2 | 3.3 |
| | relaxing rate during annealing (%) | | 0 | 0 | 0 | 0 | 0 | 0 | 0 |
| | modulus of elasticity (N/mm$^2$) | | 2700 | 2700 | 2700 | 2700 | 2700 | 2700 | 2700 |
| evaluation | shape deformation/recovery characteristics | | A | A | A | A | A | A | A |
| | glossiness | | C | A | C | A | C | C | A |
| | self-extinguishing characteristics | | A | A | A | A | A | A | A |
| | dripping-resistant characteristics | | A | A | A | A | A | D | D |
| | draw-whitening characteristics | | A | C | A | C | B | A | C |

TABLE 3-5

| | | weight average molecular weight Mw | Comparative Examples | | | | | | |
|---|---|---|---|---|---|---|---|---|---|
| | | | 3-15 | 3-16 | 3-17 | 3-18 | 3-19 | 3-20 | 3-21 |
| polyamide | nylon-6,6 | 50000 | 100 | 100 | 100 | | | | |
| | nylon-6 | 90000 | | | | 100 | 100 | 100 | 100 |
| | semi-aromatic polyamide | 90000 | | | | | | | |
| fine particles | crosslinked nitrile rubber | | | | | 4 | 25 | | |
| | crosslinked silicone resin | | 4 | 25 | | | | 4 | 25 |
| | crosslinked acrylic resin | | | | 4 | | | | |
| | drawing magnification | | 3.2 | 3.3 | 3.2 | 3.2 | 3.3 | 3.2 | 3.3 |
| | relaxing rate during annealing (%) | | 0 | 0 | 0 | 0 | 0 | 0 | 0 |
| | modulus of elasticity (N/mm$^2$) | | 2700 | 2700 | 2700 | 2700 | 2700 | 2700 | 2700 |
| evaluation | shape deformation/recovery characteristics | | A | A | A | A | A | A | A |
| | glossiness | | C | A | C | C | A | C | A |
| | self-extinguishing characteristics | | A | A | A | A | A | A | A |
| | dripping-resistant characteristics | | D | D | D | A | A | A | A |
| | draw-whitening characteristics | | A | C | B | A | C | A | C |

| | | weight average molecular weight Mw | Comparative Examples | | | | | |
|---|---|---|---|---|---|---|---|---|
| | | | 3-22 | 3-23 | 3-24 | 3-25 | 3-26 | 3-27 |
| polyamide | nylon-6,6 | 50000 | | | | | | |
| | nylon-6 | 90000 | 100 | | | | | |
| | semi-aromatic polyamide | 90000 | | 100 | 100 | 100 | 100 | 100 |
| fine particles | crosslinked nitrile rubber | | | 4 | 25 | | | |
| | crosslinked silicone resin | | | | | 4 | 25 | |
| | crosslinked acrylic resin | | 4 | | | | | 4 |

TABLE 3-5-continued

|  |  |  |  |  |  |  |  |
|---|---|---|---|---|---|---|---|
|  | drawing magnification | 3.2 | 3.2 | 3.3 | 3.2 | 3.3 | 3.2 |
|  | relaxing rate during annealing (%) | 0 | 0 | 0 | 0 | 0 | 0 |
|  | modulus of elasticity (N/mm$^2$) | 2700 | 2700 | 2700 | 2700 | 2700 | 2700 |
| evaluation | shape deformation/recovery characteristics | A | B | B | B | B | B |
|  | glossiness | C | C | A | C | A | C |
|  | self-extinguishing characteristics | A | A | A | A | A | A |
|  | dripping-resistant characteristics | A | A | A | A | A | A |
|  | draw-whitening characteristics | B | A | C | A | C | B |

<Discussion>

As shown in the afore-mentioned Examples and Comparative Examples, it became apparent that artificial hair fiber having both of superior shape deformation/recovery characteristics and glossiness close to that of human hair can be obtained by allowing a particular amount of the fine particles to be contained in the resin composition and allowing the modulus of elasticity of the fiber to be in the range of 500 to 15000 N/mm$^2$. In addition, it became apparent that shape deformation/recovery characteristics can be further improved by allowing the modulus of elasticity of the fiber to be in the range of 2400 to 3000 N/mm$^2$, and that shape deformation/recovery characteristics can be further improved by allowing the modulus of elasticity of the fiber to be in the range of 2600 to 2700 N/mm$^2$.

Further, it became apparent that shape deformation/recovery characteristics is especially superior when aliphatic polyamide (nylon-6 and nylon-6,6) was used as the polyamide.

In addition, it became apparent that whitening during drawing can be suppressed by using fine particles made from crosslinked nitrile rubber.

Further, it became apparent that dripping-resistant characteristics can be improved by allowing the weight average molecular weight Mw of the polyamide to be in the range of 6.5×10$^4$ to 15×10$^4$.

The invention claimed is:

1. An artificial hair fiber comprising a resin composition including at least one polyamide, the artificial hair fiber satisfying at least one of constitutions (1) to (3):
   (1) the fiber has a modulus of elasticity of 2400 to 3000 N/mm2;
   (2) the at least one polyamide has a total weight average molecular weight Mw of 6.5×10$^4$ to 15×10$^4$ and the fiber has a modulus of elasticity of 500 to 15000 N/mm$^2$;
   (3) the fiber has a modulus of elasticity of 500 to 15000 N/mm$^2$ and the resin composition contains 5 to 20 parts by mass of fine particles with respect to 100 parts by mass of the polyamide; wherein the average particle diameter is between 0.05 and 15 μm.

2. The artificial hair fiber of claim 1, satisfying the constitution (1).

3. The artificial hair fiber of claim 1, satisfying the constitution (2).

4. The artificial hair fiber of claim 1, satisfying the constitution (3).

5. The artificial hair fiber of claim 1, wherein the fiber satisfies the constitution (2) or the constitution (3), and the modulus of elasticity is 2400 to 3000 N/mm2.

6. The artificial hair fiber of claim 1, wherein the modulus of elasticity is 2600 to 2800 N/mm2.

7. The artificial hair fiber of claim 1, wherein the resin composition contains an aliphatic polyamide.

8. The artificial hair fiber of claim 7, wherein the aliphatic polyamide contains at least one selected from the group consisting of nylon-6 and nylon-6,6.

9. The artificial hair fiber of claim 1, wherein the at least one polyamide has a total weight average molecular weight Mw of 6.5×10$^4$ to 15×10$^4$.

10. The artificial hair fiber of claim 1, wherein the at least one polyamide has a total weight average molecular weight Mw of 7×10$^4$ to 12×10$^4$.

11. The artificial hair fiber of claim 1, wherein the resin composition comprises organic crosslinked fine particles.

12. The artificial hair fiber of claim 11, wherein the organic crosslinked fine particles are at least one selected from the group consisting of crosslinked nitrile rubber, crosslinked acrylic resin, crosslinked polyester, crosslinked polyamide particles, crosslinked silicone resin, crosslinked polystyrene resin, and crosslinked polyethylene resin.

13. The artificial hair fiber of claim 12, wherein the organic crosslinked fine particles comprise 6 to 15 parts by mass with respect to 100 parts by mass of the polyamide.

14. The artificial hair fiber of claim 11, wherein the organic crosslinked fine particles comprise 5 to 20 parts by mass with respect to 100 parts by mass of the polyamide.

15. The artificial hair fiber of claim 11, wherein the organic crosslinked fine particles contain at least one of crosslinked nitrile rubber and crosslinked silicone resin.

16. The artificial hair fiber of claim 11, wherein the organic crosslinked fine particles contain crosslinked nitrile rubber.

17. The artificial hair fiber of claim 1, wherein the fiber has a fineness of 10 to 150 dtex.

* * * * *